(12) United States Patent
Ehrhardt et al.

(10) Patent No.: US 6,228,219 B1
(45) Date of Patent: *May 8, 2001

(54) ROSIN SIZING AT NEUTRAL TO ALKALINE PH

(75) Inventors: Susan M. Ehrhardt, Haddenfield, NJ (US); D. Bruce Evans, Bethlehem, PA (US)

(73) Assignee: Hercules Incorporated, Wilmington, DE (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/396,115

(22) Filed: Sep. 14, 1999

Related U.S. Application Data

(63) Continuation of application No. 08/365,399, filed on Dec. 28, 1994, now Pat. No. 6,033,526.

(51) Int. Cl.[7] ............... D21H 17/62; D21H 17/52; D21H 17/55
(52) U.S. Cl. ............ 162/180; 162/164.3; 162/164.6; 162/183; 162/168.2
(58) Field of Search ............ 162/180, 168.2, 162/168.1, 168.3, 164.1, 164.3, 164.6, 173, 158, 179, 181.1, 181.2, 181.3, 183, 135; 106/238, 144

(56) References Cited

U.S. PATENT DOCUMENTS

| | | | |
|---|---|---|---|
| 2,601,597 | 6/1952 | Daniel et al. ............... | 92/21 |
| 3,077,430 | 2/1963 | Moore et al. ............... | 162/168 |
| 3,186,900 | 6/1965 | DeYoung et al. ............ | 162/164 |
| 3,193,449 | 7/1965 | Aldrich et al. ............. | 162/180 |
| 3,248,353 | 4/1966 | Coscia et al. .............. | 260/29.2 |
| 3,382,142 | 5/1968 | Holm et al. ................ | 162/168 |
| 3,406,139 | 10/1968 | Hurwitz et al. ............ | 260/29.6 |
| 3,526,524 * | 9/1970 | Kulick ...................... | 106/238 |
| 3,527,719 | 9/1970 | Hurwitz et al. ............ | 260/17.4 |
| 3,565,755 | 2/1971 | Davison et al. ............ | 162/168 |
| 3,865,769 | 2/1975 | Davison et al. ............ | 260/27 |
| 3,966,654 | 6/1976 | Aldrich et al. ............. | 260/24 |
| 4,109,053 | 8/1978 | Aldrich et al. ............. | 428/413 |
| 4,219,382 | 8/1980 | Leffler et al. .............. | 162/180 |
| 4,323,425 * | 4/1982 | Dowthwaite et al. ....... | 162/168.2 |
| 4,591,412 | 5/1986 | Hechler et al. ............. | 162/158 |
| 4,722,964 | 2/1988 | Chan et al. ................. | 524/608 |
| 4,857,149 | 8/1989 | Tiedeman et al. .......... | 162/158 |
| 4,878,999 | 11/1989 | Gowan, Jr. et al. ........ | 162/164.6 |
| 5,192,363 * | 3/1993 | Busseell et al. ............ | 106/218 |
| 5,320,712 | 6/1994 | Sawayama et al. ......... | 162/168.2 |
| 5,393,337 * | 2/1995 | Nakamura et al. ......... | 106/238 |
| 5,393,338 * | 2/1995 | Pudney et al. ............. | 106/238 |
| 5,510,003 * | 4/1996 | Colasurdo et al. ......... | 162/158 |
| 6,033,526 | 3/2000 | Ehrhardt et al. ........... | 162/180 |

FOREIGN PATENT DOCUMENTS

| | | |
|---|---|---|
| 746057 | 11/1966 | (CA) . |
| 266820 | 4/1989 | (DE) . |
| 80302253.3 | 3/1980 | (EP) . |
| 1266829 | 3/1970 | (GB) . |
| 1412254 | 1/1972 | (GB) . |
| 56-16898 | 12/1981 | (JP) . |
| 1239193 | 9/1989 | (JP) . |
| 549541 | 12/1975 | (RU) . |
| 711219 | 1/1980 | (RU) . |
| 549219 | 6/1990 | (RU) . |

OTHER PUBLICATIONS

E. Poppel and I. Bicu; Practical and Theoretical Results in the Field of Wet Strength Paper Manufacturing with EPI–Polyamide Resin; Das Papier 23, 672–682 (1969).

Christopher J. Biermann; Rosin Zizing with Polyamine Mordants from Ph3 to 10; Tappi Journal, pp. 166–171 (May 1992).

* cited by examiner

*Primary Examiner*—Jose Fortuna
(74) *Attorney, Agent, or Firm*—Woodcock Washburn Kurtz Mackiewicz & Norris LLP

(57) ABSTRACT

Disclosed is a method for sizing paper at a pH of about 5.0–8.5 by incorporating a sizing composition consisting essentially of (1) rosin, (2) a cationic polyamine resin at a weight ratio of rosin to cationic polyamine of about 5:1 to about 1:2, and (3) up to 0.3% alum. The cationic polyamine resin is selected from the group consisting of polyalkyleneamine-epihalohydrin resins, polyalkyleneamine-dicyandiamide-epihalohydrin resins, poly(diallylamine.HCl)-epihalohydrin resins, poly(methyldiallylamine.HCl)-epihalohydrin resins, epihalohydrin-modified polyethyleneimine resins, amine-modified poly(methyldiallylamine.HCl)-epihalohydrin resins and mixtures thereof.

32 Claims, No Drawings

ROSIN SIZING AT NEUTRAL TO ALKALINE PH

This is a continuation of U.S. patent application Ser. No. 08/365,399, filed Dec. 28, 1994, now U.S. Pat. No. 6,033,526, which is incorporated herein by reference.

FIELD OF THE INVENTION

This invention relates to rosin sizes for paper.

BACKGROUND OF THE INVENTION

Sizing agents are used by the paper industry to give paper and paperboard some degree of resistance to wetting and penetration by aqueous liquids. There are two basic categories of sizing agents: acid and alkaline. Acid sizing agents are intended for use in acid papermaking systems, traditionally less than pH 5. Analogously, alkaline sizing agents are intended for use in alkaline papermaking systems, typically at a pH greater than 6.5.

Most acid sizing agents are based on rosin. The development of sizing with a rosin-based size is dependent upon its reaction with papermaker's alum, $Al_2(SO_4)_3 \cdot 14–18\ H_2O$. Since aluminum species that exist predominantly at a low pH (<pH 5) are required for the appropriate interactions needed to effect sizing, rosin and alum have been used primarily in acid papermaking systems. It has been shown that, by proper selection of addition points in the papermaking system and by using cationic dispersed rosin sizes, rosin-based sizes can be used in papermaking systems up to about pH 7, thus extending the range of acid sizes. However, due to the limitations imposed by alum chemistry, the efficiency of rosin-based sizes decreases above about pH 5.5.

Sizing agents developed for papermaking systems above pH 6.5 are generally based on alkyl ketene dimer (AKD) or alkenyl succinic anhydride (ASA). AKD sizes function by forming covalent bonds with cellulose to give proper orientation and anchoring of the hydrophobic alkyl chains. This covalent bond formation makes AKD sizing very efficient and resistant to strong penetrants. However, AKD sizes have some limitations: small changes in the amount of size added can lead to large differences in sizing (steep sizing response curve), and there is a slow rate of sizing development (cure).

The other major alkaline sizing agent is based on ASA. As with AKD, the development of sizing with ASA sizes is also dependent on the formation of covalent bonds with cellulose to give proper orientation and anchoring. ASA is more reactive than AKD, resulting in the greater development of sizing on-machine. However, the reaction rate with water is also greater, producing a hydrolyzate that is an inefficient sizing agent in alkaline systems and contributes to the formation of deposits on the papermaking machine. To minimize the formation of hydrolyzate, ASA is typically emulsified at the mill immediately before addition to the papermaking system.

Cationic resins have been used previously in the papermaking process, although not the cationic resins of this invention in combination with rosin in the absence of alum or with amounts of alum $\leq 0.3\%$, based on the dry weight of paper pulp. For example, U.S. Pat. No. 3,186,900 discloses sizing paper at a neutral to acid pH using alum and a preblend of a rosin size and a cationic polyamide-epihalohydrin resin, which is not one of the cationic resins of this invention. U.S. Pat. No. 3,966,654 discloses an aqueous fortified rosin dispersion consisting essentially of (a) 5% to 50% fortified rosin, (b) 0.5% to 10% of a cationic resin dispersing agent selected from (i) a polyaminopolyamide-epihalohydrin resin, (ii) an alkylenepolyamine-epihalohydrin resin, and (iii) a poly (diallylamine)-epihalohydrin resin, and (c) water to 100%. Papermaking examples disclose the use of at least 0.4% alum. A process for the nonreactive sizing of paper at a neutral pH in the substantial absence of alum is disclosed in U.S. Pat. No. 4,878,999. The sizing composition comprises saponified fortified rosin and a cationic material consisting essentially of a cationic polymer and a cationic starch.

Rosin sizing with polyamine mordants at a pH of 3 to 10 with and without alum is disclosed in Biermann, C. J., *Tappi Journal*, May, 1992. Quaternary amines are said to produce very little sizing.

There is still a need for a rosin sizing system for use at a neutral to alkaline pH that does not have the disadvantages of ASA and AKD sizes.

SUMMARY OF THE INVENTION

The method of this invention for sizing paper or paperboard comprises incorporating into the paper pulp at a pH of about 5.0 to about 8.5 a sizing composition consisting essentially of (a) rosin, (b) a cationic component consisting essentially of a cationic polyamine resin, wherein the weight ratio of rosin to cationic polyamine is about 5:1 to about 1:2, preferably about 1:1, and the cationic polyamine is selected from the group consisting of polyalkyleneamine-epihalohydrin resins, polyalkyleneamine-dicyandiamide-epihalohydrin resins, poly(diallylamine•HCl)-epihalohydrin resins, poly(methyldiallylamine•HCl)-epihalohydrin resins, epihalohydrin-modified polyethyleneimine, amine-modified poly(methyldiallylamine•HCl)-epihalohydrin resins and mixtures thereof, and (c) up to 0.3% alum, based on the dry weight of the pulp.

The rosin-based sizes of this invention are effective at a neutral to slightly alkaline pH. In paper making, pH 6.5–7.5 is considered to be "neutral". Rosin-based sizes do not have the short-comings associated with AKD and ASA alkaline sizing agents. Rosin sizes do not depend on covalent bond formation, therefore they do not have on-machine size development problems. Rosin is tacky, not waxy, therefore it is not expected to contribute to slip. It is also possible to make high solids (50%) dispersions that have a relatively long shelf life of six months to a year. The sizing response curve for rosin sizes is gradual, not steep, and the sizes are relatively inexpensive.

DETAILED DESCRIPTION OF THE INVENTION

According to the present invention it has been discovered that rosin-based sizes can be used at a pH of about 5.0 to about 8.5, preferably about 5.5 to about 8.0, and most preferably about 6.0 to about 7.5, when certain cationic epihalohydrin-modified polyamine resins are present. The cationic resins are used to anchor the rosin to the paper pulp. The cationic polyamine resins suitable for use in the present invention are selected from the group consisting of polyalkyleneamine-epihalohydrin resins, polyalkyleneamine-dicyandiamide-epihalohydrin resins, poly(diallylamine•HCl)-epihalohydrin resins, poly (methyldiallylamine•HCl)-epihalohydrin resins, epihalohydrin-modified polyethyleneimine, amine-modified poly(methyldiallylamine•HCl)-epihalohydrin resins. The weight ratio of rosin to cationic polyamine resin is preferably about 5:1 to about 1:2, more preferably about 1:1.

Exemplary cationic polyamine resins useful in accordance with the present invention include bishexamethylenetriamine-epichlorohydrin resin, poly(methyldiallylamine•HCl)-epichlorohydrin resin, diethylenetriamine-dicyandiamide-epichlorohydrin resin, epichlorohydrin-modified polyethyleneimine resin, hexamethylenediamine-epichlorohydrin resin, poly(diallylamine•HCl)-epichlorohydrin resin, diethylenetriamine/epichlorohydrin resin, triethylenetetraamine/epichlorohydrin resin, tetraethylenepentaamine/epichlorohydrin resin, imino-bis-propylamine/epichlorohydrin resin, and 1,6-hexamethylenediamine-co-1,2-dichloroethane/epichlorohydrin resin.

The rosin used in the process of this invention can be any of the commercially available types of rosin such as, for example, wood rosin, gum rosin, tall oil rosin, and mixtures thereof, in their crude or refined state. Fortified rosin, partially or substantially completely hydrogenated rosins and polymerized rosins, as well as rosins that have been treated to inhibit crystallization such as by heat treatment or reaction with formaldehyde can also be used. Fortified rosins are typically prepared by well known procedures involving reacting rosin with acid compounds, including α,β-unsaturated monobasic and polybasic organic acids and acid anhydrides such as acrylic, maleic, fumaric, itaconic, and citraconic acids and their anhydrides. Preparation of fortified rosins is disclosed in U.S. Pat. Nos. 2,628,918 and 2,684,300, the disclosures of which are incorporated herein by reference. "Rosin size" also includes sizes prepared from rosin containing various amounts of fatty acids or fatty acid mixtures, e.g., a tall oil rosin fraction obtained from the fractional distillation of tall oil and containing up to several percent of a tall oil fatty acid mixture. The amounts of rosin useful in accordance with the method of the present invention typically vary from about 0.1 to about 1 weight %, based on the dry weight of the pulp used.

Preferably, a dispersed rosin size is used in accordance with the present invention. Dispersed rosin sizes are well known, such as those described in U.S. Pat. Nos. 3,565,755, 3,966,654, and 4,522,686, the disclosures of which are incorporated by reference in their entirety. The cationic polyamine resin can be added to the pulp separately or as part of the size emulsion. When added separately, it is preferable to add the cationic resin first, followed by the size. The cationic resins can be incorporated into the aqueous phase during emulsification or added after emulsification.

A small amount of alum, typically 0.1 to 0.3% by weight, based on the dry weight of the pulp, can also be present in the sizing composition of this invention, but its presence is not required. Alum acts to anchor the sizing agent to the paper pulp only at acid pH's. At neutral to alkaline pH's, as well as at acid pH's, it helps to retain fine particles on the paper pulp fibers, and to dissipate static charges. The term "alum" is meant to include papermaker's alum (aluminum sulfate) as well as other inorganic aluminum salts such as, for example, aluminum chloride, polyaluminum chlorides, aluminum chlorohydrate, and mixtures thereof. Aluminum sulfate is preferred.

The amounts of cationic resin and alum, if present, depend upon the type of papermaking machinery used, the temperature, the points of addition of the additives in the papermaking system, the amount of anionic materials present in the pulp, and the type of pulp. For example, mechanical pulp or pulp from recycled paper could contain larger amounts of anionic material and would therefore require larger amounts of alum and cationic resin than "cleaner" bleached kraft pulp.

The rosin size/cationic resin compositions of this invention can effectively size pulp furnishes containing clay, $TiO_2$, calcium carbonate, and other fillers.

High levels of size and/or cationic resin cause no significant reduction in the paper coefficient of friction.

In accordance with the present invention the sizing agents can be applied as internal sizing agents or surface sizing agents. Internal sizing involves adding the size to the paper pulp slurry before sheet formation, while surface sizing involves immersion of the paper in the sizing agent or spraying the sizing agent on the paper, followed by drying at elevated temperatures in accordance with known drying techniques. The present invention is useful in sizing paper materials such as, for example, printing and writing paper and linerboard.

In this specification, all parts and percentages are by weight unless indicated otherwise.

The Hercules Size Test (HST) is a standard test in the industry for measuring the degree of sizing. This method employs an aqueous dye solution as the penetrant to permit optical detection of the liquid front as it moves through the sheet. The apparatus determines the time required for the reflectance of the sheet surface not in contact with the penetrant to drop to a predetermined percentage of its original reflectance. All HST testing data reported measure the seconds to 80% reflection with 1% formic acid ink unless otherwise noted. The use of formic acid ink is a more severe test than neutral ink and tends to give faster test times. High HST values are better than low values. The amount of sizing desired depends upon the kind of paper being made and the system used to make it.

In the following examples, evaluations were made using a blend of hardwood and softwood bleached kraft pulps (70% Weyerhaeuser bleached hardwood kraft, 30% Rayonier bleached softwood kraft) refined to Canadian standard freeness (CSF) of 500 cc. The water for dilutions was adjusted to contain 100 ppm hardness and 50 ppm alkalinity.

A pilot scale papermachine designed to simulate a commercial Fourdrinier was used, including stock preparation, refining and storage. Dry lap pulp was refined at 2.5% consistency in a double disc refiner by recirculation until the desired freeness was reached. The stock was then pumped to a machine chest where it was diluted with fresh water to approximately 1.0% solids.

The stock was fed by gravity from the machine chest to a constant-level stock tank; from there, the stock was pumped to a series of in-line mixers (mix boxes) where wet end additives were added. After passing through the mix boxes, the stock entered the fan pump where further chemical additions could be made. The stock was diluted with white water at the fan pump to about 0.2% solids.

The stock was pumped from the fan pump to a flow spreader and then to the slice, where it was deposited onto the 12-inch wide Fourdrinier wire. Immediately after its deposition on the wire, the sheet was vacuum-dewatered via two vacuum boxes; couch consistency was normally 14–15%.

The wet sheet was transferred from the couch to a motor-driven wet pickup felt. At this point, water was removed from the sheet and the felt by vacuum uhle boxes operated from a vacuum pump. The sheet was further dewatered in a single-felted press and left the press section at 38–40% solids.

A 65 $g/m^2$ (40 $lb/3000\ ft^2$ ream) sheet was formed and dried on four dryer cans to 3–5% moisture (internal dryer can temperatures were 180, 200, 220, and 240° F.).

The cationic resins, rosin sizing agents and alum were added to the pulp slurry before sheet formation, as specified in each example. If needed, pH was adjusted using caustic or sulfuric acid at the first mixer.

In the examples, the following abbreviations are used: 1MB—first in-line mixer; 2MB—second mixer; 3MB—third mixer; FP—fan pump, OM—off machine, and NA—naturally aged.

cationic resin, and RETEN® 201 is a polyamine/epichlorohydrin resin, both of which are available from Hercules Incorporated, Wilmington, Del., U.S.A. Resin 1 is a bis(hexamethylenetriamine)/epichlorohydrin cationic resin prepared as described in Example F of U.S. Pat. No. 3,966,654, The disclosure of which is incorporated in its entirety.

TABLE 1

| | * HST (Seconds) | | | | | | | |
|---|---|---|---|---|---|---|---|---|
| % | No Cationic Resin | | Cationic Resin 1 Present | | KYMENE ® 557 Present | | RETEN ® 201 Present | |
| Alum | OM | NA | OM | NA | OM | NA | OM | NA |
| 0 | 0 | 0 | 30 | 172 | 0 | 0 | 0 | 0 |
| 0.25 | 17 | 16 | 372 | 536 | 136 | 125 | 17 | 29 |

* 0.4% Cationic resin added at 2MB; 0.4% fortified tall oil resin dispersed size added at 3MB; 0.25% alum added at FP; tray pH is 7.5

EXAMPLE 1

This example shows that a rosin sizing composition containing a cationic resin of this invention produces sizing in the absence of alum, while rosin sizing compositions containing cationic resins that are not a part of this invention do not produce sizing.

A fortified rosin size was prepared by reacting formaldehyde-treated tall oil rosin (92.5 parts) with fumaric acid (7.5 parts) at a temperature of about 205° C. After substantially all of the fumaric acid reacted, the fortified rosin was cooled to room temperature (about 23° C.). The fortified rosin contained 7.5% fumaric acid, substantially all of which was in the combined or adducted form. An organic phase was prepared by blending 325 parts of the fortified rosin with 217 parts of methylene chloride until dissolved.

An aqueous phase was prepared by combining 4.2 parts of Alipal CO-436 with 542 parts distilled water and 46 parts of an aqueous 4% caustic solution. Alipal CO-436 is an ammonium salt of the sulphate ester of an alkylphenoxy (polyethyleneoxy) ethanol available from Rhone-Poulenc, Inc., Princeton, N.J., U.S.A. The organic and aqueous phases were combined and blended for two minutes in a Waring blender. The premix was then homogenized in a piston homogenizer, two passes at 3000 psi. The methylene chloride was stripped off by heating the resulting emulsion for 5 minutes at a temperature of about 100° C. The final product was filtered through a 100 mesh screen to remove any agglomerated solids ("breakout") formed during formulation. The resulting fortified rosin dispersed size had a total solids content of about 35%, negligible breakout, and a particle size of about 0.5 microns.

The results of the Hercules Sizing Test (HST) are shown in Table 1. The data obtained using a fortified rosin dispersed size composition containing a cationic resin of this invention (Resin 1) are compared with data from sizing compositions made with the fortified rosin dispersed size containing two other cationic resins that are not a part of this invention. KYMENE® 557H is a polyamidoamine/epichlorohydrin

EXAMPLE 2

This example shows sizing in the presence of 0.25% alum as a function of the amount of cationic resin used.

The data are shown in Table 2. The fortified tall oil rosin dispersed size was prepared as described in Example 1. The cationic resin is a bis(hexamethylenetriamine)/epichlorohydrin cationic resin, which was prepared as described in Example F of U.S. Pat. No. 3,966,654.

TABLE 2

| | *HST (Seconds) | |
|---|---|---|
| % Cationic Resin | OM | NA |
| 0.0 | 17 | 16 |
| 0.1 | 102 | 180 |
| 0.2 | 192 | 275 |
| 0.4 | 372 | 536 |

*Cationic resin added at 2 MB; 0.4% fortified tall oil rosin dispersed size added at 3 MB; 0.25% alum added at FP; tray pH is 7.5.

At the addition levels of cationic resin used in this example, sizing increased as the amount of cationic resin was increased.

EXAMPLE 3

This example shows the effect on sizing of adding various amounts of alum to the sizing compositions of this invention at various pH's.

The fortified rosin dispersed size was prepared as described in Example 1. The cationic resin is a diethylenetriamine/dicyandiamide/epichlorohydrin and was prepared as described in Example B, U.S. Pat. No. 4,240,295, the disclosure of which is incorporated by reference in its entirety. Results are reported in Table 3.

TABLE 3

| | * HST (Seconds) | | | | | | | |
|---|---|---|---|---|---|---|---|---|
| | 0.35% Cationic Resin | | | | | | No Cationic Resin | |
| | No alum | | 0.25% alum | | 1.0% alum | | 1.0% alum | |
| pH | OM | NA | OM | NA | OM | NA | OM | NA |
| 8.0 | 7 | 184 | 48 | 54 | | | | |
| 7.5 | 66 | 18 | 199 | 250 | 68 | 85 | 13 | 19 |
| 6.5 | 74 | 296 | 432 | 552 | 252 | 279 | 55 | 58 |
| 5.5 | 45 | 110 | 415 | 647 | 287 | 334 | 86 | 99 |
| 4.5 | 1 | 41 | 393 | 752 | 308 | 531 | 31 | 42 |

* Cationic resin added at 2MB; 0.35% fortified tall oil resin dispersed size added at 3 MB; alum added at FP as specified, tray pH as specified.

The optimum pH range for rosin/cationic resin sizing without alum is about 5.5 to 7.5. Low levels of alum, about 0.25%, increase sizing effectiveness.

It is not intended that the examples given here should be construed to limit the invention, but rather they are submitted to illustrate some of the specific embodiments of the invention. Various modifications and variations of the present invention can be made without departing from the scope of the appended claims.

We claim:

1. A method for sizing paper comprising incorporating into the paper pulp at a pH of abut 5.0 to about 8.5 a sizing composition consisting essentially of (a) rosin, (b) cationic polyamine resin, wherein the weight ratio of rosin to cationic resin is about 5:1 to about 1:2 and the cationic polyamine resin is selected from the group consisting of polyalkyleneamine-epihalohydrin resins, polyalkyleneamine-dicyandiamide-epihalohydrin resins, poly(diallylamine•HCl)-epihalohydrin resins, epihalohydrin-modified polyethyleneimine, amine-modified poly(methyldiallylamine•HCl)-epihalohydrin resins and mixtures thereof, and (c) up to 0.3% alum based on the dry weight of the pulp.

2. The method of claim 1, wherein the pH is about 5.5 to about 8.0.

3. The method of claim 2, wherein the pH is about 6.0 to about 7.5.

4. The method of claim 1, wherein the weight ratio of rosin to cationic polyamine is about 1:1.

5. The method of claim 1, wherein the amount of rosin added is about 0.1 to about 1% by weight, based on the dry weight of the paper pulp.

6. The method of claim 1, wherein alum is present in an amount of 0.1 to 0.3% by weight, based on the dry weight of the paper pulp.

7. The method of claim 6, wherein the alum is aluminum sulfate.

8. The method of claim 1, wherein the method is carried out in the absence of alum.

9. The method of claim 8, wherein the method is carried out in the absence of aluminum sulfate.

10. The method of claim 1, wherein the cationic resin is selected from the group consisting of bis-hexamethylenetriamine-epichlorohydrin resin, poly(methyldiallylamine•HCl)-epichlorohydrin resin, diethylenetriamine-dicyandiamide-epichlorohydrin resin, epichlorohydrin-modified polyethyleneimine resin, hexamethylenediamine-epichlorohydrin resin, poly(diallylamine•HCl)-epichlorohydrin resin, diethylenetriamine/epichlorohydrin resin, triethylenetetraamine/epichlorohydrin resin, tetraethylenepentaamine/epichlorohydrin resin, imino-bis-propylamine/epichlorohydrin resin, and 1,6-hexamethylenediamine-co-1,2-dichloroethane/epichlorohydrin resin.

11. The method of claim 1, wherein the pH is about 5.5 to about 8.0; the cationic resin is selected from the group consisting of bis-hexamethylenetriamine-epichlorohydrin resin, poly(methyldiallylamine•HCl)-epichlorohydrin resin, diethylenetriamine-dicyandiamide-epichlorohydrin resin, epichlorohydrin-modified polyethyleneimine resin, hexamethylenediamine-epichlorohydrin resin, poly(diallylamine•HCl)-epichlorohydrin resin, diethylenetriamine/epichlorohydrin resin, triethylenetetraamine/epichlorohydrin resin, tetraethylenepentaamine/epichlorohydrin resin, imino-bis-propylamine/epichlorohydrin resin, and 1,6-hexamethylenediamine-co-1,2-dichloroethane/epichlorohydrin resin, and the method is carried out in the absence of alum.

12. The method of claim 11, wherein the weight ratio of rosin to cationic polyamine is about 1:1.

13. The method of claim 11, wherein the amount of rosin added is about 0.1 to about 1% by weight based on the dry weight of paper pulp.

14. The method of claim 1, wherein the pH is about 5.5 to about 8.0; the cationic resin is selected from the group consisting of bis-hexamethylenetriamine-epichlorohydrin resin, poly(methyldiallylamine•HCl)-epichlorohydrin resin, diethylenetriamine-dicyandiamide-epichlorohydrin resin, epichlorohydrin-modified polyethyleneimine resin, hexamethylenediamine-epichlorohydrin resin, poly(diallylamine•HCl)-epichlorohydrin resin, diethylenetriamine/epichlorohydrin resin, triethylenetetraamine/epichlorohydrin resin, tetraethylenepentaamine/epichlorohydrin resin, imino-bis-propylamine/epichlorohydrin resin, and 1,6-hexamethylenediamine-co-1,2-dichloroethane/epichlorohydrin resin, and the method is carried out in the presence of alum in an amount of 0.1 to 0.3% by weight based on the dry weight of the paper pulp.

15. The method of claim 14, wherein the weight ratio of rosin to cationic polyamine is about 1:1.

16. The method of claim 14, wherein the amount of rosin added is about 0.1 to about 1% by weight based on the dry weight of the paper pulp.

17. A method for anchoring a rosin based size to paper pulp, said method comprising contacting the pulp and size with a cationic polyamine resin selected from the group consisting of polyalkyleneamine-epihalohydrin resins, polyalkyleneamine-dicyandiamide-epihalohydrin resins, poly(diallylamine•HCl)-epihalohydrin resins, poly(methyldiallylamine•HCl)-epihalohydrin resins, epihalohydrin-modified polyethyleneimine resins, amine-modified poly(methyldiallylamine•HCl)-epihalohydrin resins, and mixtures thereof, wherein the weight ratio of the rosin to cationic polyamine resin is about 5:1 to about 1:2, and said method is conducted at a pH of about 5 to about 8.5.

18. The method of claim 17, wherein the pH is about 5.5 to about 8.0.

19. The method of claim 18, wherein the pH is about 6.0 to about 7.5.

20. The method of claim 17, wherein the weight ratio of rosin to cationic polyamine resin is about 1:1.

21. The method of claim 17, wherein the amount of rosin added is about 0.1 to about 1% by weight, based on the dry weight of the paper pulp.

22. The method of claim 17, wherein the amount of rosin added is about 0.1 to about 1% by weight, based on the dry weight of the paper pulp.

23. The method of claim 22, wherein the alum is aluminum sulfate.

24. The method of claim 17, wherein the method is carried out in the absence of alum.

25. The method of claim 24, wherein the method is carried out in the absence of aluminum sulfate.

26. The method of claim 17, wherein the cationic resin is selected from the group consisting of bis-hexamethylenetriamine-epichlorohydrin resin, poly(methyldiallylamine•HCl)-epichlorohydrin resin, diethylenetriamine-dicyandiamide-epichlorohydrin resin, epichlorohydrin-modified polyethyleneimine resin, hexamethylenediamine-epichlorohydrin rein, poly(diallylamine•HCl)-epichlorohydrin resin, diethylenetriamine/epichlorohydrin resin, triethylenetetraamine/epichlorohydrin resin, tetraethylenepentaamine/epichlorohydrin resin, imino-bis-propylamine/epichlorohydrin resin, and 1,6-hexamethylenediamine-co-1,2-dichloroethane/epichlorohydrin resin.

27. The method of claim 17, wherein the cationic resin is selected from the group consisting of bis-hexamethylenetriamine-epichlorohydrin resin, poly(methyldiallylamine•HCl)-epichlorohydrin resin, diethylenetriamine-dicyandiamide-epichlorohydrin resin, epichlorohydrin-modified polyethyleneimine resin, hexamethylenediamine-epichlorohydrin resin, poly(diallylamine•HCl)-epichlorohydrin resin, diethylenetriamine/epichlorohydrin resin, triethylenetetraamine/epichlorohydrin resin, tetraethylenepentaamine/epichlorohydrin resin, imino-bis-propylamine/epichlorohydrin resin, and 1,6-hexamethylenediamine-co-1,2-dichloroethane/epichlorohydrin resin, and the method is carried out in the absence of alum.

28. The method of claim 27, wherein the weight ratio of rosin to cationic polyamine resin is about 1:1.

29. The method of claim 27, wherein the amount of rosin added is about 0.1 to about 1% by weight based on the dry weight of paper pulp.

30. The method of claim 17, wherein the pH is about 5.5 to about 8.0; the cationic resin is selected from the group consisting of bis-hexamethylenetriamine-epichlorohydrin resin, poly(methyldiallylamine•HCl)-epichlorohydrin resin, diethylenetriamine-dicyandiamide-epichlorohydrin resin, epichlorohydrin-modified polyethyleneimine resin, hexamethylenediamine-epichlorohydrin resin, poly(diallylamine•HCl)-epichlorohydrin resin, diethylenetriamine/epichlorohydrin resin, triethylenetetraamine/epichlorohydrin resin, tetraethylenepentaamine/epichlorohydrin resin, imino-bis-propylamine/epichlorohydrin resin, and 1,6-hexamethylenediamine-co-1,2-dichloroethane/epichlorohydrin resin, and the method is carried out in the presence of alum in an amount of 0.1 to 0.3% by weight based on the dry weight of the pulp.

31. The method of claim 30, wherein the weight ratio of rosin to cationic polyamine resin is about 1:1.

32. The method of claim 30, wherein the amount of rosin added is about 0.1 to about 1% by weight, based on the dry weight of the paper pulp.

* * * * *

UNITED STATES PATENT AND TRADEMARK OFFICE
CERTIFICATE OF CORRECTION

PATENT NO. : 6,228,219 B1 Page 1 of 1
DATED : May 8, 2001
INVENTOR(S) : Susan M. Ehrhardt and D. Bruce Evans It is certified that error appears in the above-identified patent and that said Letters Patent is hereby corrected as shown below:

Column 7,
Line 12, Table 3, third column, please delete "18" and insert -- 158 -- therefor.
Line 14, Table 3, third column, please delete "110" and insert -- 170 -- therefor.
Line 36, following "resins,", please insert -- poly(methydiallylamine•·HCL)-epihalohydrin resins, --.

Column 9,
Lines 1-3, please delete "the amount of rosin added is about 0.1 to about 1% by weight, based on the dry weight of the paper pulp." and insert -- said method is carried out in the presence of alum in an amount of 0.1 to 0.3% by weight based on the dry weight of the pulp. -- therefor.

Signed and Sealed this

Fourth Day of January, 2005

JON W. DUDAS
*Director of the United States Patent and Trademark Office*